(12) United States Patent
Drori

(10) Patent No.: US 6,196,395 B1
(45) Date of Patent: Mar. 6, 2001

(54) FILTER DEVICE AND METHOD OF OPERATING SAME

(76) Inventor: Mordeki Drori, 6400 Center St. Suite A201, Mentor, OH (US) 44060-4159

( * ) Notice: Subject to any disclaimer, the term of this patent is extended or adjusted under 35 U.S.C. 154(b) by 0 days.

(21) Appl. No.: 09/302,928

(22) Filed: Apr. 30, 1999

(51) Int. Cl.[7] .................................................. B01D 29/66
(52) U.S. Cl. .................... 210/412; 210/416.2; 210/418; 92/100; 417/395
(58) Field of Search .................................. 210/411, 412, 210/416.2, 418; 92/98 R, 99, 100; 417/395, 398, 502

(56) References Cited

U.S. PATENT DOCUMENTS

| | | | |
|---|---|---|---|
| 862,867 | * | 8/1907 | Eggleston .............................. 417/390 |
| 2,367,935 | | 1/1945 | Franck . |
| 2,578,730 | * | 12/1951 | Nicholson et al. .................... 92/100 |
| 2,733,572 | * | 2/1956 | Butterfield et al. .................... 92/100 |
| 3,365,065 | | 1/1968 | Varjabedian . |
| 3,389,797 | * | 6/1968 | Giardini ............................... 210/412 |
| 4,923,601 | | 5/1990 | Drori . |
| 4,944,887 | | 7/1990 | Frederick . |
| 5,013,461 | | 5/1991 | Drori . |
| 5,328,604 | | 7/1994 | Drori . |
| 5,397,465 | | 3/1995 | Stewart . |
| 5,591,329 | | 1/1997 | Davidson . |

* cited by examiner

*Primary Examiner*—Matthew O. Savage
(74) *Attorney, Agent, or Firm*—Renner, Otto, Boisselle & Sklar, PLL

(57) ABSTRACT

An external regeneration mechanism including a housing having two chambers and a displaceable member disposed between said two chambers and at least two passages are defined on said housing. The first passage is communicating with the first chamber and the filter outlet and the second passage is communicating with the second chamber and the filter inlet of same filter. A rod having an external handle is coupled to said displaceable member and is adapted to move by an external source of power said displaceable member linearly back and forth in order to dislodge particles and filter aid material from the external surface of the filter element.

10 Claims, 5 Drawing Sheets

FILTER DEVICE AND METHOD OF OPERATING SAME

FIELD OF THE INVENTION

The present invention relates to a method and a device for filtering fluids and, more particularly, to a filter for use with filter aid materials that is adapted to perform a regeneration of the filter aid materials by an external regeneration mechanism.

BACKGROUND OF THE INVENTION

Fluid filter devices have been proposed over the years utilizing filter aid materials or other filter media for better filtration. Some of said filters comprise filter element or elements having a large surface area but with no mechanism to regenerate the filter aid material. Other filters known in the market comprise a mechanism contained inside the filter housing such as the construction proposed in U.S. Pat. No. 5,591,329 to Davidson, which discloses a filter having a single filter element and an inner mechanism such as a piston to perform the regeneration of the filter aid material. U.S. Pat. No. 5,013,461 to Drori discloses a method for regeneration of filter aid material comprising a filter with an internal mechanism for regenerating the filter aid material. U.S. Pat. No. 2,367,935 to Franck, U.S. Pat. No. 3,365,065 to Varjaberian and U.S. Pat. No. 5,396,465 to Stewart disclose filters having an inner mechanism such as a piston to perform the regeneration of the filter aid material. U.S. Pat. Nos. 4,923,601, 5,112,481 and 5,328,604 to Drori and U.S. Pat. No. 4,944,887 to Frederick disclose different types of internal mechanisms to regenerate the filter aid material such as a mechanism to rotate back and forth the filter element during the regeneration operation. All of the above mechanisms are internal of the filter housing and therefore occupy some of the filter housing inner volume in order to properly perform the regeneration operation. Many filters with different constructions and configurations are known in the market in which the filter element occupies the entire inner volume of the filter housing and, therefore, an internal mechanism to regenerate the filter aid material cannot be adapted. An external regeneration mechanism is therefore required in the market that is adapted to be assembled on the existing types of filters in order to regenerate the filter aid material. Said external regeneration mechanism will have following features:

a. Does not require an additional inner volume to the filter housing;

b. Can be sold as a unit to be assembled to any existing filter presently in the market without making changes to the filter construction; and c. Can be assembled on filters with existing design and construction which are still in the production line without changes in the filter production line.

SUMMARY OF THE INVENTION

The present invention provides an external regeneration mechanism which does not require changes in the inner volume of the filter housing as it is adapted to be assembled outside the filter housing in order to perform the dislodging and regenerating of particles and filter aid material accumulated on the external surface of the filter element by circulating the fluid in the filter. The external regeneration mechanism can be sold as a separate unit to be assembled on any existing filter presently in the market having the existing design and construction and be assembled to filters which are already in the production line without making any changes in the filter production line.

There is thus provided in accordance with a preferred embodiment of the present invention a filter having at least one inner filter element, said filter being in communication with an external regeneration mechanism and with an external valve.

There is thus provided in accordance with another preferred embodiment of the present invention an external regeneration mechanism adapted to be coupled to existing filters in the market in order to circulate the liquid contained in the filter during either the regeneration operation or the cleaning operation, thus to either assist to regenerate the filter aid material accumulated on the external surface of the filter element or assist in the cleaning operation of the filter element.

There is thus provided in accordance with another preferred embodiment of the present invention an external regeneration mechanism constructed and operative outside the inner volume of the filter housing therefore leaving the entire inner volume of the housing free for filtration.

There is thus provided in accordance with another preferred embodiment of the present invention an external regeneration mechanism comprising an inner displaceable member such as a diaphragm or a piston located between two internal chambers and a rod coupled to said displaceable member and to an external handle.

There is thus provided in accordance with another preferred embodiment of the present invention an external regeneration mechanism adapted to be in communication with the inlet and outlet of the filter and with the inlet and outlet of a valve.

BRIEF DESCRIPTION OF THE DRAWINGS

The present invention will be understood and appreciated fully from the following descriptions in conjunction with the drawings in which.

DETAILED DESCRIPTION OF THE PREFERRED EMBODIMENTS

Figure 1:
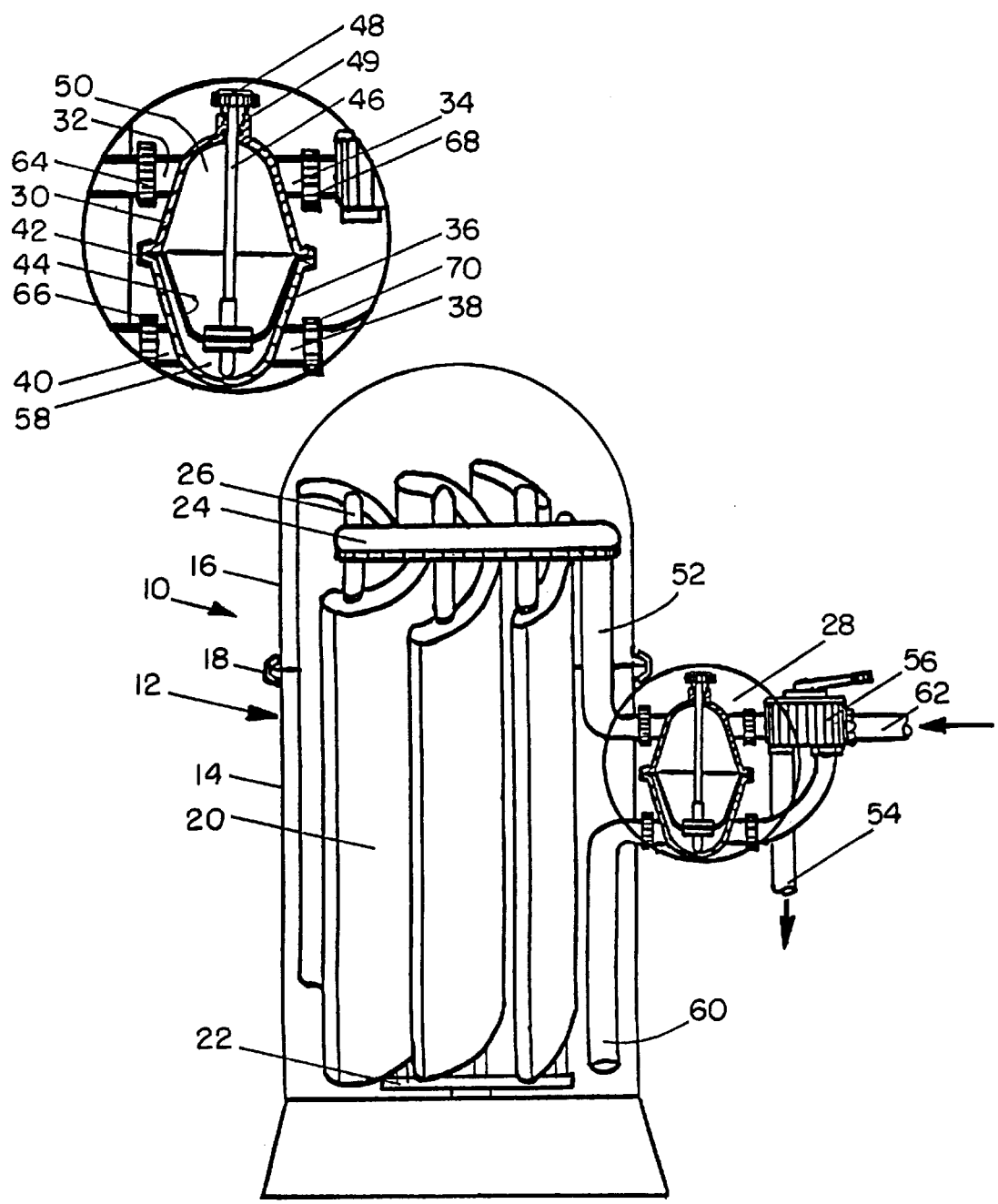
FIG. 1 is a side sectional illustration of a filter and an external regeneration mechanism in accordance with a preferred embodiment of the present invention.

Referring now to FIG. 1, there is illustrated a filter having an external regeneration mechanism constructed in accordance with a preferred embodiment of the present invention beginning with the reference numeral 10. The filter 10 comprises housing 12 having a bottom housing 14, a cover 16, and a clamping ring 18 which couples cover 16 and bottom housing 14 together. A filter element 20 is disposed inside the housing 12 and is supported by a support 22 at its bottom side and connected at its upper side to a manifold 24 by hollow ribs 26 in such a manner that the filtered liquid flows from the internal volume of filter element 20 via ribs 26 to manifold 24 and vice versa. External regeneration mechanism 28 comprises an upper cup 30 with passages 32 and 34 mounted thereon and a lower cup 36 having passages 38 and 40 mounted thereon. A clamping ring 42 secures a diaphragm 44 between the upper cup 30 and the bottom cup 36. A rod 46 located substantially in the center of external regeneration mechanism 28 penetrates through upper cup 30. The first end of the rod 46 is coupled to an external handle 48 having a screw 49. The other end of the rod 46 is connected to the diaphragm 44. The regeneration mechanism 28 also comprises first and second internal chambers 50 and 58 located on opposite sides of the diaphragm 44. The first chamber 50 is in communication with the manifold 24 via the filter outlet pipe 52 and the passage 32 and also with valve outlet 54 via passage 34 and valve 56. The second chamber 58 is in communication with filter inlet pipe 60 via passage 40 and also with valve inlet 62 via valve 56 and passage 38. External regeneration mechanism 28 is coupled to the filter housing 12 by couplings 64 and 66 and to valve 56 by couplings 68 and 70. During filtration operation non-filtered fluid flows via inlet 62, multi-valve 56, passage 38, chamber 58, passage 40, pipe 60 and enters the bottom housing 14. The fluid continues to flow through the filter aid material collected on the external surface of the filter element 20, through the filter element via internal volume of filter element 20, through the ribs 26, manifold 24, pipe 52, passage 32, chamber 50, passage 34, valve 56 and to outlet 54. Filtration operation continues until the flow is interrupted by particles collected on the external surface of the filter element 20. When a pre-determined differential pressure is built then the regeneration operation is required.

During the regeneration operation the flow to and from passages 34 and 38 is closed by multi-valve 56 which is set to a regeneration position. An exterior source of power such as man power rotates the handle 48 to an unlocked position and moves the rod 46 linearly in one direction. Liquid contained in the chamber 50 flows via passage 32, pipe 52, manifold 24, ribs 26, to internal volume of filter element 20 and dislodges particles and filter aid material from the external surface of the filter element 20 to the bottom of housing 12. Simultaneously, liquid flows to chamber 58 from housing 12 via pipe 60 and passage 40. After several strokes up and down of the rod 46, the rod 46 is locked by screw 49 and multi-valve 56 is reset to filtering operation and the filtering operation resumes. The external regeneration mechanism can be adapted to different filters and assembled by couplings 64, 66, 68 and 70.

Figure 2:
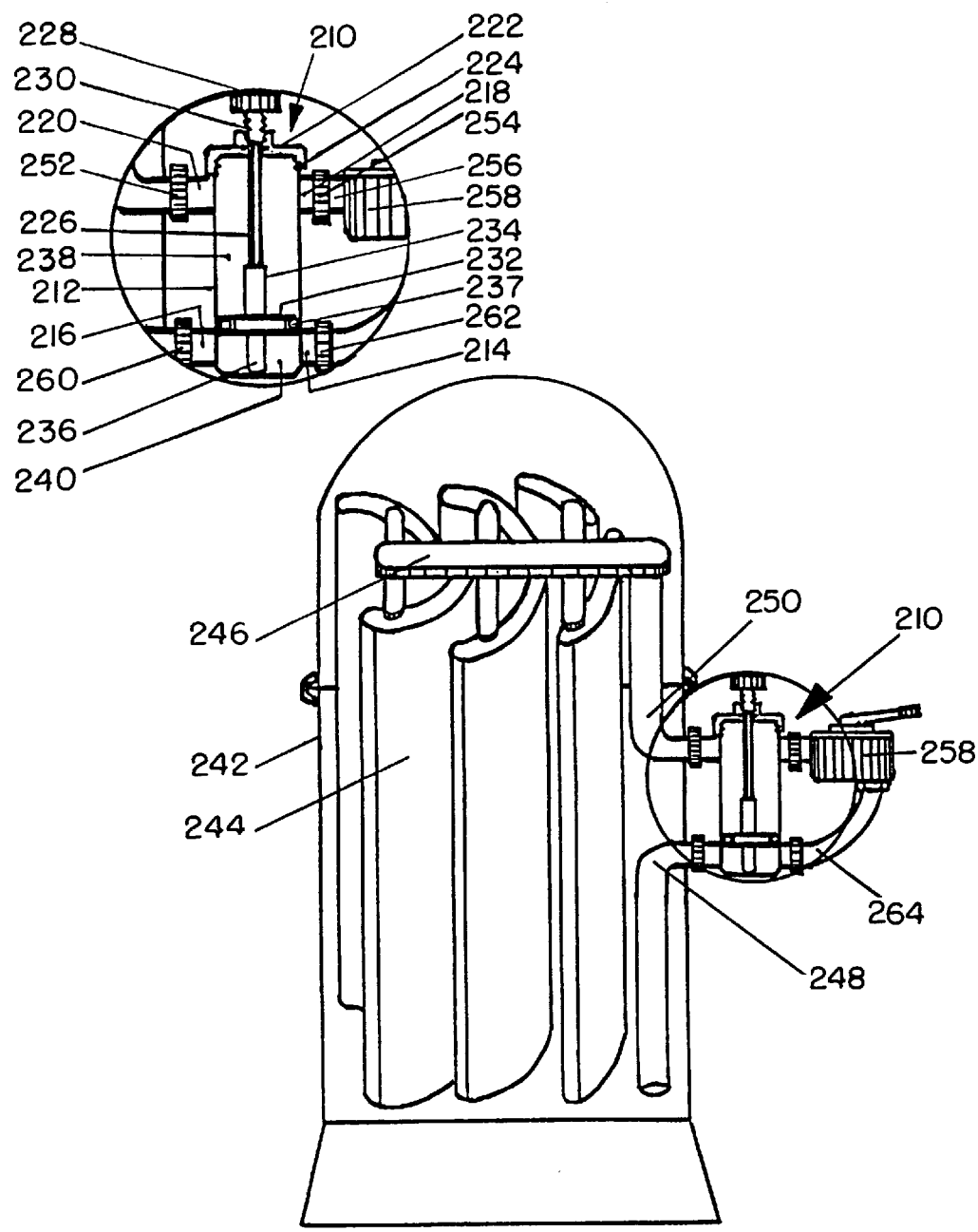
FIG. 2 is a side sectional illustration of a filter and another external regeneration mechanism in accordance with a preferred embodiment of the present invention.

Referring now to FIG. 2, there is illustrated a filter similar to the filter of FIG. 1 having an external regeneration mechanism in accordance with another preferred embodiment of the present invention beginning with reference numeral 210. External regeneration mechanism 210 comprises a cylinder 212 having bottom passages 214 and 216 for the non-filtered liquid and upper passages 218 and 220 for the filtered liquid. A cover 222 is coupled to the cylinder 212 by thread 224. A rod 226 penetrates through cover 222. One end of the rod 226 is coupled to an external handle 228 having screw 230. The other end of the rod 226 is coupled to piston 232 having stops 234 and 236. An elastic member such as an O-Ring or disc or flange 237 is secured to the circumference of the piston 232. The linear movement of piston 232 is limited by the stops 234 and 236 between bottom passages 214 and 216 and upper passages 218 and 220. An upper chamber 238 communicates between passages 218 and 220, and a lower chamber 240 communicates between passages 214 and 216. The external regeneration mechanism also comprises couplings 252, 254, 260 and 262. The coupling 252 connects outlet 250 and passage 220. The coupling 254 couples between passages 218 and 256 of multi-valve 258. The couplings 252 and 254 couple the external regeneration mechanism to the outlet 250 and passage 256 of valve 258 in order to transfer filtered liquid. The coupling 260 couples the inlet 248 with passage 216 in order to transfer non-filtered liquid between valve 258 and the inlet 248. The coupling 262 couples passage 264 with passage 214.

During filtration operation non-filtered fluid flows via valve 258, passage 264, passage 214, chamber 240, passage 216, inlet 248 to internal volume of filter housing 242. Particles of filter aid material are distributed on the external surface of the filter element 244 thereby creating a filter cake. The fluid flows passing through said filter cake through filter element 244 to internal volume of filter element 244 while particles contained in said fluid remain on the external surface of the filter aid material cake. The filtered liquid continues flowing from the internal volume of the filter element 244 via manifold 246, outlet 250, passage 220, chamber 238, passage 218, passage 256, to valve 258 to a reservoir such as a swimming pool (not shown). When a differential pressure is built as a result of the accumulated particles on the external surface of the filter aid cake, which interrupt the flow, a regeneration operation is required.

In the regeneration operation, valve 258 is set on regeneration operation. The handle 228 is rotated to the unlock position and the piston 232 is manually operated to move linearly in one direction. Liquid from chamber 238 flows via passage 220, outlet 250, manifold 246 to internal volume of filter element 244, and induces the dislodge of particles and the filter aid material cake from the external surface of the filter element 244. Simultaneously, liquid from the external volume of the filter element 244 flows via inlet 248, passage 216, to chamber 240. The linear back and forth movement of the piston 232 continues the regeneration operation. After a few strokes when the particles and filter aid material cake are dislodged from the external surface of filter element 244, the valve 258 is set to the filtering operation and filtration operation resumes.

Figure 2A:
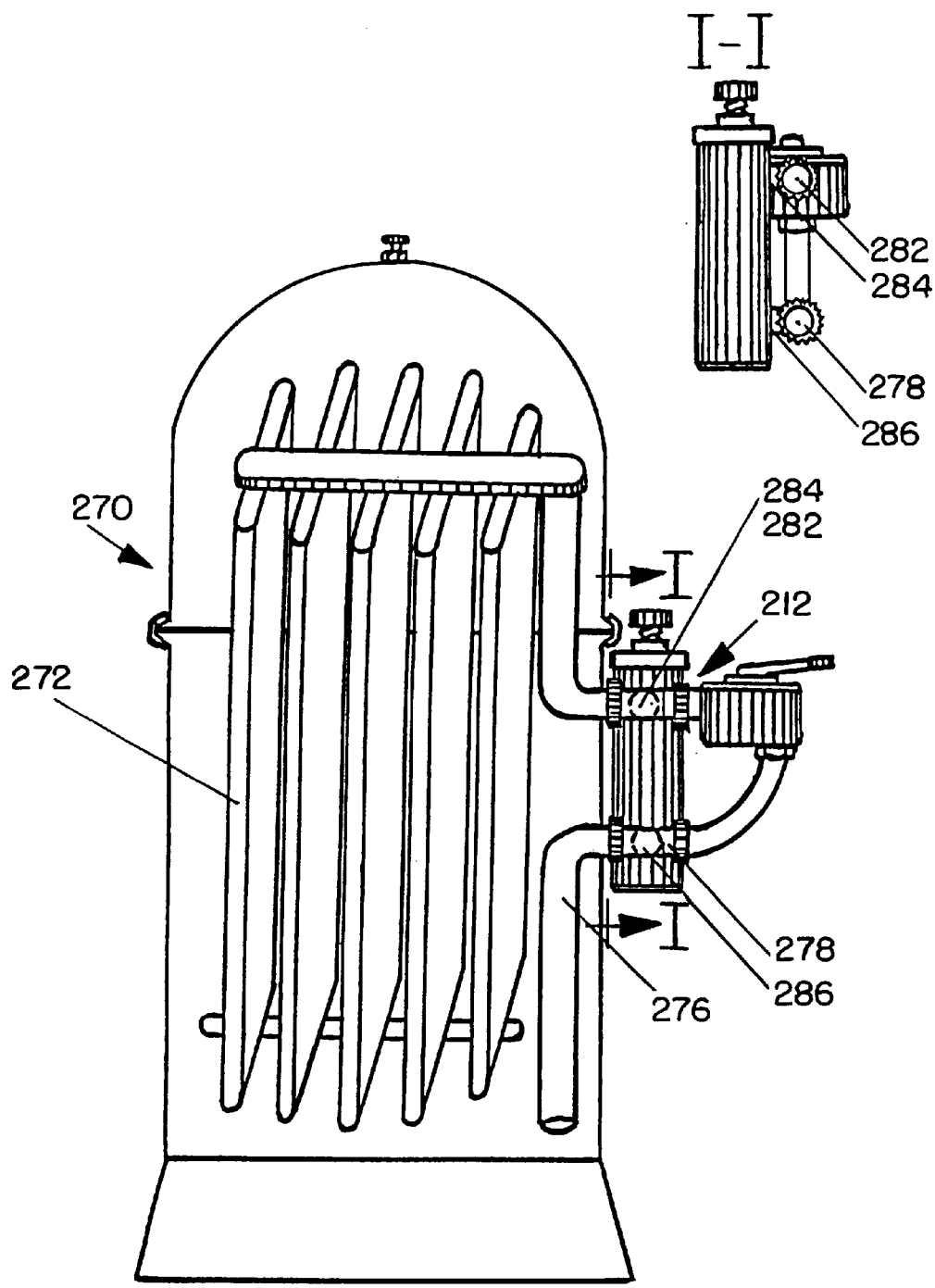
FIG. 2A is a side sectional illustration of a filter and a side view of an external regeneration mechanism in accordance with a preferred embodiment of the present invention.

Referring now to FIG. 2A, there is illustrated a filter in accordance with another preferred embodiment of the present invention beginning with the reference numeral 270. The filter 270 has different configurations of filter elements 272. The multi-valve is coupled to inlet 276 by means such as a coupling 278, and also to an outlet by means such as coupling 282. An external regeneration mechanism 212 is similar to the one illustrated in FIG. 2 with the difference that in FIG. 2A, the external mechanism 212 comprises only two passages, namely an upper passage 284 coupled to coupling 282, and a bottom passage 286 coupled to coupling 278. Filtration and regeneration operations are similar to that disclosed with respect to the embodiment shown FIG. 2.

Figure 3:
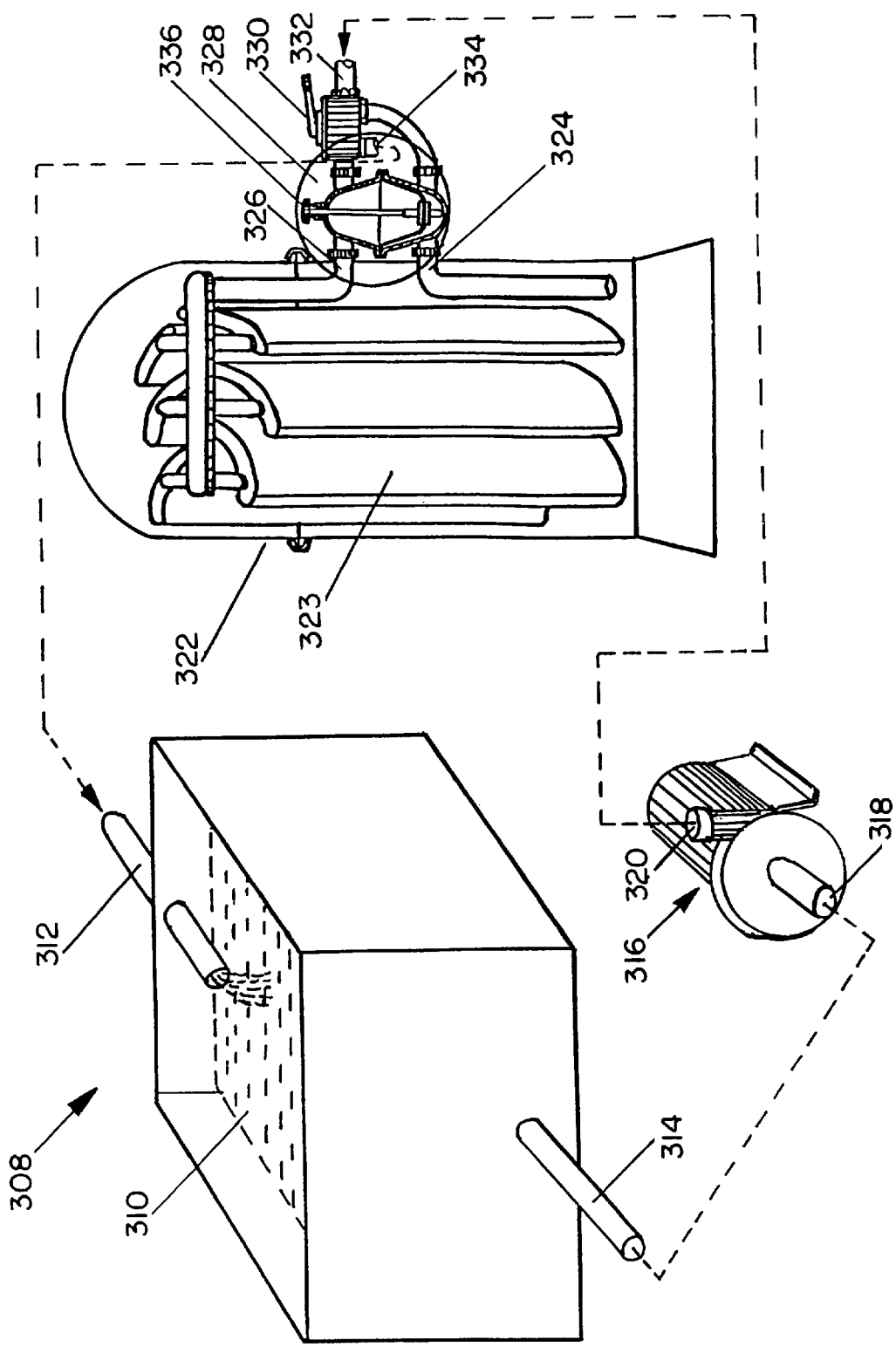
FIG. 3 is an illustration of a filter system and an external regeneration mechanism in accordance with a preferred embodiment of the present invention.

Referring now to FIG. 3, there is illustrated a system operating in accordance with a preferred embodiment of the present invention beginning with the reference numeral 308. The system 308 comprises a reservoir such as a swimming pool 310 having an inlet 312 for filtered fluid and an outlet 314 for non-filtered fluid. A pump 316 has an inlet 318 in communication with the reservoir outlet 314 and a pump outlet 320. A filter 322 has an inlet passage 324 and an outlet passage 326. An external regeneration mechanism 328 is coupled to the filter 322. A multi-valve 330 has an inlet 332 in communication with the pump outlet 320. A valve outlet 334 is in communication with inlet 312 of the reservoir 310. A multi-valve 330 is coupled to the external mechanism 328.

During filtration operation non-filtered liquid is sucked from the reservoir outlet 314 by pump 316, to pump inlet 318. Pressurized fluid exits from the outlet 320, flows to valve inlet 332, through bottom chamber of external regeneration mechanism 328, to filter inlet passage 324. Particles contained in the fluid accumulate on the external surface of filter element 323. The fluid than passes through the filter element 323 and leaves the filter via filter outlet passage 326, upper chamber of external regeneration mechanism 328, valve outlet 334 to reservoir inlet 312, until a regeneration operation is required.

During the regeneration operation pump 316 is shut-off and valve 330 is set to regeneration operation. The handle 336 is manually operated linearly back and forth in order to dislodge particles accumulated on the external surface of the filter element 323. After a few strokes back and forth of handle 336 the filtration operation resumes.

Figure 3A:
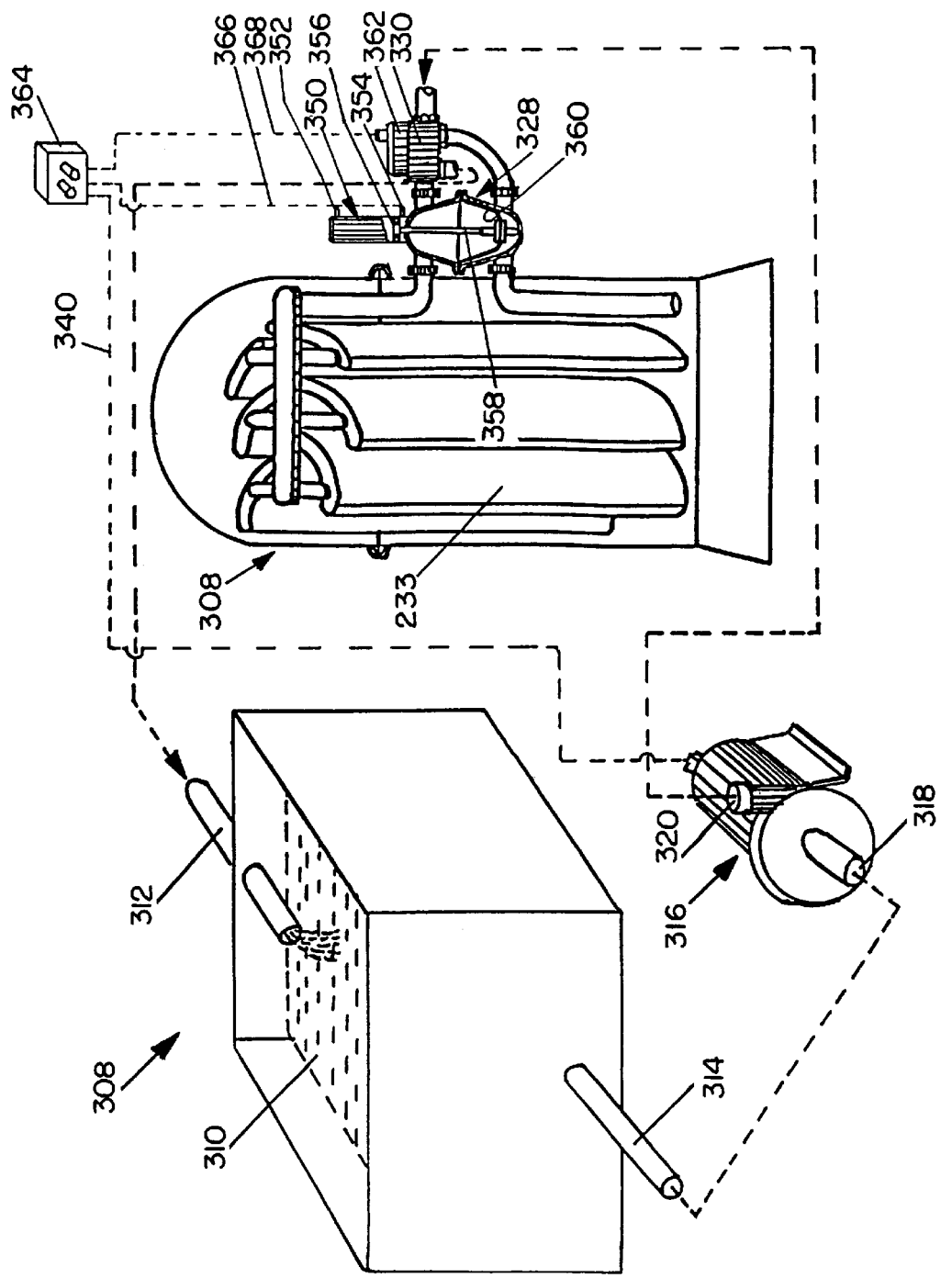
FIG. 3A is an illustration of a filter system having automation components in accordance with a preferred embodiment of the present invention.

Referring now to FIG. 3A, there is illustrated a system similar to the system illustrated in FIG. 3 except that the system in FIG. 3A also includes control and automation means in accordance with a preferred embodiment of the present invention. A hydraulic or pneumatic cylinder 350 has operating passages 352 and 354. A piston 356 is coupled to external regeneration unit 328. The piston 356 is coupled to rod 358 which is in communication with membrane 360 in such a manner that during regeneration operation the piston 356 may linearly move membrane 360 up and down. An automatic unit 362 is connected to multi-valve 330 in order to automatically operate multiple valve 330. A controller 364 operates and controls: the system 308; piston 356 via tubes 366; valve 330; automatic unit 362 via wire 368; and pump 316 via tubes 340.

During filtration operation the controller 364 sets valve 330 into filtering operation and operates pump 316. The flow of the liquid during filtering operation is similar to the flow described in FIG. 3. When regeneration operation is required the controller 364 shuts-off the pump 316, sets valve 330 into regeneration operation position and displaces piston 356 and internal diaphragm 360 of the external regeneration unit linearly up and down in order to dislodge the particles accumulated on the external surface of the filter element 233. After a pre-determined period of time, the controller 364 automatically resets the valve 330 to filtering operation and resets the pump to its on position. The automatic controller 364 can be either coupled to or located inside the pump 316.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed:

1. A fluid filter comprising:

a filter housing having a filter inlet for receiving non-filtered fluid and a filter outlet for discharging the filtered fluid, at least one filter element is disposed inside said housing defining an external surface being in fluid communication with said filter inlet and the non filtered fluid and an inner hollow being in fluid communication with said filter outlet and the filtered fluid;

an external regeneration mechanism coupled to said filter housing and being in communication with said filter outlet and said filter inlet, the external regeneration mechanism being located outside said filter housing and comprising first and second cups coupled to each other and a diaphragm fastened between said first and second cups, a first chamber located between said first cup and said diaphragm being in communication via first hollow means with said outlet and a second chamber located between said second cup and said diaphragm being in communication via second hollow means with said inlet, and a rod having first and second ends penetrating said first cup, said first end is coupled to an external handle and said second end is coupled to said diaphragm, characterized in that during the regeneration operation an external source of power displaces said handle to increase the distance between said first cup and said handle to induce fluid to flow from said first chamber via said first hollow means and said filter outlet to said inner hollow of said filter element and to dislodge particles from the external surface of said filter element and simultaneously to induce fluid to flow from the external volume of said filter element via said filter inlet and said second hollow means to said second chamber.

2. The filter of claim 1 also comprising a valve coupled to said external regeneration mechanism and being in communication via third hollow means with said first chamber and said filter outlet and in communication via fourth hollow means with said second chamber and said filter inlet.

3. The filter of claim 1 further including a valve for communicating non-filtered fluid to said filter inlet and filtered fluid from said filter outlet.

4. The filter of claim 1 further including a valve having a valve outlet for communicating filtered fluid from said first chamber and said filter outlet and a valve inlet for communicating non-filtered fluid to said second chamber and said filter inlet during a filtering operation.

5. An external regeneration mechanism comprising:

a housing having first and second chambers, a displaceable member disposed between said first and said second chambers, and at least two passages first and second, said first passage being in communication with said first chamber and said second passage being in communication with said second chamber, a rod penetrating through said housing having a first external end coupled to an external handle and a second interior end being coupled to said displaceable member;

characterized in that a filter outlet of a filter is in communication via said first passage with said first chamber and a filter inlet of same filter is in communication via said second passage with said second chamber and said displaceable member is adapted to move linearly in a first direction and a second direction, opposite that of the first direction, wherein linear movement of said displaceable member in the first direction induces liquid contained in said first chamber to flow via said first passage to said filter outlet and simultaneously induces liquid to flow from said filter inlet via said second passage to said second chamber, and wherein the linear movement of said displaceable member in the second direction induces the liquid contained in said second chamber to flow via said second passage to said filter inlet and liquid from said filter outlet of said filter to flow via said first passage to said first chamber.

6. The external regeneration mechanism of claim 5 wherein said external regeneration mechanism is coupled to a filter having a filter inlet for the non-filtered liquid and a filter outlet for the filtered liquid and at least one filter element disposed inside said filter in such a manner that the external surface of said filter element is in communication via second hollow means with said filter inlet and the internal volume of said filter element is in communication via first hollow means with said filter outlet, wherein by moving said displaceable member linearly in the first direction fluid from said first chamber flows via said first passage, said filter outlet to said internal volume of said filter element and dislodges particles accumulated on the external surface of said filter element, and simultaneously the fluid from the external volume of said filter element flows via said filter inlet, said second passage to said second chamber of said external regeneration mechanism.

7. The external regeneration mechanism of claim 5 wherein said first and second chambers of said external regeneration mechanism are in communication with, respectively, a valve inlet and a valve outlet of an external valve, the valve inlet communicating non-filtered fluid to the second chamber and the valve outlet communicating filtered liquid from the first chamber.

8. The external regeneration mechanism of claim 5 wherein said first chamber of said external regeneration mechanism is adapted to be in communication via a third passage with a valve outlet of a valve and via said first passage with said filter outlet of the filter and said second chamber of said external regeneration mechanism is adapted to be in communication via a fourth passage with a valve inlet of the same valve and via said second passage with the filter inlet of the same filter.

9. The external regeneration mechanism of claim 5 wherein said displaceable member comprises a diaphragm.

10. An external regeneration mechanism comprising:

a housing having first and second chambers, a displaceable member disposed between said first and said second chambers, and at least two passages first and second, said first passage being in communication with said first chamber and said second passage being in communication with said second chamber, a rod penetrating through said housing having a first external end coupled to an external handle and a second interior end being coupled to said displaceable member, characterized in that said first passage is adapted to be in communication via first hollow means with an internal volume of a filter element disposed in a filter and said second passage is adapted to be in communication via second hollow means with an external volume of said filter element, said displaceable member is adapted to move linearly in a first direction and a second direction, opposite that of the first direction, wherein linear movement of said displaceable member in the first direction induces liquid contained in said first chamber to flow via said first passage to the internal volume of said filter element and simultaneously induces liquid to flow from the external volume of said filter element via said second passage to said second chamber, and wherein the linear movement of said displaceable member in the second direction induces the liquid contained in said second chamber to flow via said second passage to the external volume of said filter element and liquid from internal volume of said filter element to flow via said first passage to said first chamber.

* * * * *